(12) United States Patent
Bourasseau et al.

(10) Patent No.: US 7,906,094 B2
(45) Date of Patent: Mar. 15, 2011

(54) METHOD FOR PRODUCING A HIGH PURITY TRISILANE PRODUCT FROM THE PYROLYSIS OF DISILANE

(75) Inventors: Cyril Bourasseau, Grenoble (FR); Gregory M. Jursich, Clarendon Hills, IL (US); Mindi Xu, Naperville, IL (US); John P. Borzio, Robbinsville, NJ (US); Donald W. Mitchell, Jr., Riegelsville, PA (US); Derong Zhou, Doylestown, PA (US); Thomas K. Moncur, Yardley, PA (US)

(73) Assignees: L'Air Liquide Societe Anonyme pour l'Etude et l'Exploitation des Procedes Georges Claude, Paris (FR); American Air Liquide, Inc., Fremont, CA (US); Air Liquide Electronics U.S. LP, Houston, TX (US)

( * ) Notice: Subject to any disclaimer, the term of this patent is extended or adjusted under 35 U.S.C. 154(b) by 508 days.

(21) Appl. No.: 11/863,524

(22) Filed: Sep. 28, 2007

(65) Prior Publication Data

US 2008/0175784 A1 Jul. 24, 2008

Related U.S. Application Data

(60) Provisional application No. 60/885,496, filed on Jan. 18, 2007.

(51) Int. Cl.
*C01B 33/04* (2006.01)

(52) U.S. Cl. ............... 423/347; 423/344

(58) Field of Classification Search ............ 423/347, 423/344, 645
See application file for complete search history.

(56) References Cited

U.S. PATENT DOCUMENTS

| 4,604,274 A | 8/1986 | Zavelovich et al. |
| 4,698,218 A | 10/1987 | Belot et al. |
| 6,027,705 A | 2/2000 | Kitsuno et al. |
| 6,858,196 B2 | 1/2003 | Todd |

FOREIGN PATENT DOCUMENTS

| FR | 02 724162 | 3/1996 |
| WO | WO 2006 107880 | 10/2006 |

OTHER PUBLICATIONS

Patent Abstracts of Japan, publication No. 61106411, May 24, 1986; application No. 59226073, Oct. 27, 1984.
Patent Abstracts of Japan, publication No. 02184513, Jul. 19, 1990; application No. 01003906, Jan. 11, 1989.
Patent Abstracts of Japan, publication No. 03183613, Aug. 9, 1991; application No. 01319979, Dec. 8, 1989.
Tebben, E.M. et al. "*Pyrolysis of disilane and trisilane,*" Inorganic Chemistry. vol. 8 No. 8 (1969).
Akhtar, Masud. "*Preparation of ultra high purity higher silanes and germanes,*" Synth. Reac. Inorg. Met-Org. Chem. vol. 16 No. 5 (1986).
Gokhale et al. "*Synthesis of higher silanes and germanes,*" J. of Inorg. and Nuc. Chem., vol. 27 (1965).
Martin, J.G. et al. "*Thermal decomposition kinetics of polysilanes: Disilane, trisilane, and tetrasilane,*" International J. of Chemical Kinetics, vol. 22, 613-632 (1990).

*Primary Examiner* — Edward M Johnson
(74) *Attorney, Agent, or Firm* — Patricia E. McQueeney

(57) ABSTRACT

Methods for the production of trisilane from the pyrolysis of disilane in a single reactor.

17 Claims, 1 Drawing Sheet

METHOD FOR PRODUCING A HIGH PURITY TRISILANE PRODUCT FROM THE PYROLYSIS OF DISILANE

CROSS REFERENCE TO RELATED APPLICATIONS

The present application claims the benefit of U.S. Provisional Application Ser. No. 60/885,496, filed Jan. 18, 2007, herein incorporated by reference in its entirety for all purposes.

BACKGROUND

This invention relates generally to the field of chemical production. More specifically, the invention relates to a method of producing a trisilane product.

Monosilane and other higher order silanes such as disilane and trisilane are useful as chemical precursors for the fabrication of integrated circuits. Typically, silanes are used as a starting material to produce a polycrystalline silicon, an epitaxial silicon, or an amorphous silicon film. Today, monosilane is most commonly used by the semiconductor industry, but it requires high process temperatures in order to decompose and create the desired film. As trisilane decomposes at lower temperatures than monosilane, trisilane allows the creation of silicon films at lower temperature process conditions and with greater overall film creation rates.

The synthesis of trisilane or other higher silanes has typically been accomplished through several methods. For instance, U.S. Pat. No. 6,858,196 teaches a method to obtain a higher silane by treating a lower silane with two electric discharge reactors which are connected in series. Monosilane is exposed to an electric discharge in a first reactor to create a product containing disilane. This product is then sent to a second reactor, and exposed to a second electric discharge to create a product containing trisilane. However, the plasma employed by this method can be unstable at high silane concentrations, making the method difficult to implement in large scale production.

U.S. Pat. No. 6,027,705 describes a method for obtaining a higher silane from a lower silane by conducting pyrolysis reactions in two reactors connected in series. However, this method uses monosilane as the starting point, and for trisilane it produces an extremely low reaction yield and production rate, making the method difficult to implement in large scale production.

Japanese Patent 02184513 teaches a method to create a higher silane through the dehydrogenation of monosilane in the presence of a specific catalyst. This method may lead to the formation of impurities like siloxanes, which may be very difficult to remove for the product. These chemical reactions also may have a very low yield and production rate.

Consequently, there exists a need for a method to produce a trisilane with a high yield and production rate, and with a low level of impurities.

SUMMARY OF THE INVENTION

Novel methods for producing trisilane are described herein. The disclosed methods produce trisilane through a pyrolysis reaction of disilane in a single reactor.

In an embodiment, a method of producing trisilane through the pyrolysis of disilane in a single reactor comprises introducing a first gas mixture into a single reactor, where the first gas mixture enters the reactor at about ambient temperature and where the first gas mixture comprises disilane and an inert gas, and is substantially free of monosilane. A second gas mixture, which comprises trisilane, is produced through a pyrolysis reaction of the first gas mixture in the reactor, where the reactor is maintained at a first temperature. The second gas mixture then is introduced into a condensing zone, where the condensing zone is made of at least a first and a second condenser. The second gas mixture is condensed in the condensing zone, and disilane is then separated from the condensed mixture, leaving a concentrated mixture of trisilane. The concentrated mixture of trisilane is purified to obtain a high purity trisilane product.

Other embodiments of the current invention may include, without limitation, one or more of the following features:
  the first gas mixture is substantially free of trisilane;
  the first gas mixture is substantially free of monosilane, containing less than about 10% by weight, preferably less than about 1% by weight, and even more preferably less than about 900 ppm.
  the first temperature range is between about 300° C. and about 500° C., preferably between about 400° C. and about 475° C.;
  the single reactor is a packed type reactor;
  the first gas mixture comprises between about 0.1% and about 10%, by weight, of an inert gas;
  the first condenser is maintained at a temperature between about −80° C. and about −60° C.;
  the second condenser is maintained at a temperature between about −130° C. and about −100° C.;
  the first gas mixture initially condenses in the first condenser, and the disilane is separated from the condensed mixture through a first condenser to second condenser sparging step;
  at least part of the disilane separated from the condensed mixture is collected and mixed with an inert gas to for introduction into the reactor;
  the concentrated mixture of trisilane comprises about 95%, by weight, of trisilane;
  particles are removed from the second gas mixture by passing the second gas mixture through a particle trap prior to introducing it to the condensation zone;
  the first gas mixture has a residence time in the single reactor between about 1 second and about 10 seconds, preferably between about 4 seconds and about 8 seconds;
  trisilane is produced with a product yield between about 20% and about 40% of the stochiometric yield rate; and
  the purification of concentrated mixture of trisilane to obtain the high purity trisilane product is performed through a distillation step.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
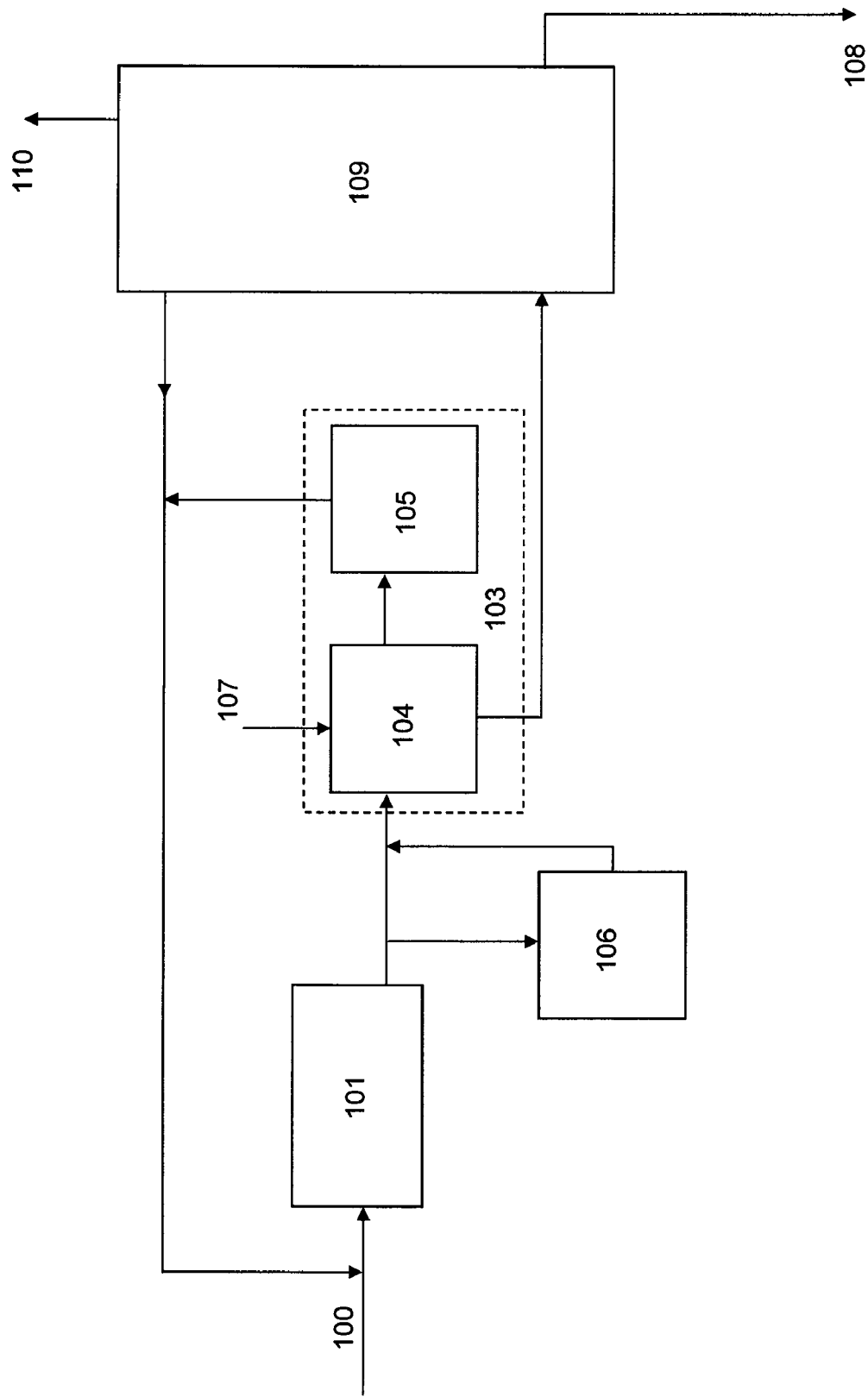
FIG. 1 illustrates a schematic representation of one embodiment of a process for making trisilane from disilane.

The pyrolysis reaction of disilane initiates with a gas phase unimolecular decomposition occurring as:

$$Si_2H_6 \rightarrow SiH_2 + SiH_4$$

with a subsequent reaction of:

$$SiH_2 + Si_2H_6 \rightarrow Si_3H_8.$$

These reactions yield a net stoichiometry of:

$$2\ Si_2H_6 \rightarrow Si_3H_8 + SiH_4.$$

As a result, of these reactions, the theoretical molar yield of formation of trisilane from disilane is 50%, such that for every two mols of disilane which decompose, one mol of trisilane is produced.

Generally, the current invention relates to a method of producing trisilane through the pyrolysis of disilane in a single reactor which comprises introducing a first gas mixture into a single reactor, where the first gas mixture enters the reactor at about ambient temperature and where the first gas mixture comprises disilane and an inert gas, and is substantially free of monosilane. A second gas mixture, which comprises trisilane, is produced through a pyrolysis reaction of the first gas mixture in the reactor, where the reactor is maintained at a first temperature. The second gas mixture then is introduced into a condensing zone, where the condensing zone is made of at least a first and a second condenser. The second gas mixture is condensed in the condensing zone, and disilane is then separated from the condensed mixture, leaving a concentrated mixture of trisilane. The concentrated mixture of trisilane is purified to obtain a high purity trisilane product.

Referring now to FIG. 1, embodiments of the method according to the current invention are described hereafter. A first gas mixture 100 is introduced into a reactor 101 which is maintained at a set temperature. The first gas mixture typical contains disilane and an inert gas such as nitrogen, argon, or helium. The first gas mixture is also generally substantially free of monosilane. In some embodiments the first gas mixture is substantially free of trisilane, and in other embodiments the first gas mixture contains the inert gas in an amount between about 0.1% and about 10%, by weight. The first gas mixture enters the reactor at a temperature preferably around ambient, and at a pressure which is preferably greater than atmospheric.

The reactor may be a conventional type reactor such as a tube type reactor made of stainless steel. The reactor may also be packed with a material to improve the temperature distribution within the reactor, and to allow for better mixing within the reactor. Some suitable types of reactor packings include, without limitation, glass wool, alumina beads, brass wool, and stainless steel wool.

The reactor is also held at a predetermined temperature to encourage the pyrolysis reaction of disilane into trisilane. In some embodiments this temperature is between about 300° C. and about 500° C., preferably between about 400° C. and about 475° C., and even more preferably between about 450° C. and 470° C. Maintaining the temperature of the reactor in these ranges is advantageous because it allows for the efficient production of trisilane, and limits the amounts of unwanted higher silanes or particulates produced. The pyrolysis of disilane to trisilane occurs at a lower temperature than the pyrolysis of monosilane to disilane. The reactor may be maintained at these temperatures in a conventional way, for instance by heating the reactor walls with heating blankets, resistance heaters, or other direct contact type heaters.

By adjusting the flow rate of the gas mixture entering into the reactor, the residence time of the first gas mixture in the reactor may be altered or optimized. In some embodiments the first gas mixture has a residence time in the reactor between about 1 second and about 10 seconds, preferably between 4 seconds and about 8 seconds. Optimizing the residence time of the first gas mixture in the reactor is advantageous in that it allows enough heat to be provided to create thermodynamic conditions which are favorable for the pyrolysis reaction to form trisilane, while at the same time subsequent reactions which may create higher silanes are largely kinetically limited.

By optimizing the temperature of the reactor and the residence time of the first gas mixture 100 in the reactor 101, the disilane contained in the first gas mixture undergoes a pyrolysis reaction to form a gas containing trisilane.

After the gas containing trisilane leaves the reactor 101, it then is introduced to a condensing zone 103. Condensing zone 103 is made up of at least a first condenser 104 and a second condenser 105. First condenser 104 and second condenser 105 may be conventional type condensers, such as air cooled or water cooled condensers, which are suitable to condense the gas containing trisilane into a condensed mixture.

Optionally, after the gas mixture containing trisilane leaves the reactor 101, but before it is introduced to the condensing zone 103 it may be sent to a particle trap 106, to remove any particles present. The particle trap 106 may be a conventional type particle trap, such as a vessel packed with glass wool, stainless steel wool, or any other material which is suitable to remove particles generated during the pyrolysis reaction.

First condenser 104 and second condenser 105 are typically held at predetermined temperatures to encourage the condensation of the gas mixture containing trisilane. In some embodiments, the temperature of the first condenser 104 is held between about −80° C. and about −60° C. In other embodiments, the temperature of the second condenser 105 is held between about −130° C. and about −100° C. The condensers may be maintained at these temperatures in a conventional way, for instance by cooling the condensers with dry ice, or with a fluid such as liquid nitrogen, octane, halocarbons, or mixtures of these.

In order to obtain a condensed mixture of trisilane, the disilane remaining in the condensed mixture contained in the first condenser 104 must be separated out. In one embodiment, this is accomplished by performing a sparging type separation between the first condenser 104 and the second condenser 105. A person of ordinary skill would recognize that sparging is process where an inert gas, such as nitrogen, argon, or helium, is bubbled through a liquid to separate a component of the liquid. In this embodiment, an inert gas 107 at about ambient temperature is bubbled through the condensed mixture contained in the first condenser 104. When the condensed mixture in the first condenser 104 is held at a temperature between about −80° C. and −60° C., the trisilane and the disilane contained in the condensed mixture have different vapor pressures (about 150 mbar for disilane and about 2 mbar for trisilane) such that bubbling the inert gas 107 through the condensed mixture causes the disilane contained therein to separate out of the condensed mixture. The separated disilane and inert gas is then sent to the second condenser 105 where it condenses and is collected to form a mixture containing mostly disilane.

Optionally, the disilane in the second condenser 105 may be, mixed with an inert gas and reintroduced into reactor 101 as at least part of the first gas mixture 100. This may be performed in either a continuous or a batch type manner.

After the disilane is separated from the condensed mixture in the first condenser 104, a concentrated mixture of trisilane is left. In some embodiments, this concentrated mixture of trisilane may contain about 95%, by weight, of trisilane.

The concentrated mixture of trisilane may then be purified to obtain a high purity trisilane product 108. In one embodiment, this is accomplished by sending the concentrated mixture of trisilane to a distillation system 109 where the mixture is purified by performing a distillation step. A person of ordinary skill in the art would recognize distillation systems are useful for purifying mixtures of liquids. Distillation system 109 may be a conventional type distillation system; for instance, it may contain elements such as a reboiler, a rectification column (typically 20 stages), a top condenser to send reflux to the column, and a second condenser to recover disilane from the concentrated mixture of trisilane. Also, a person of ordinary skill in the art would recognize that purification methods other than distillation, such as adsorption or filtration, could be used without limitation, according to the current invention, to purify the concentrated mixture of trisilane.

For safety reasons, a positive pressure may be maintained in the distillation column by introducing a small flow of an inert gas (not shown), such as helium, through the column.

The high purity trisilane product 108 may be removed from the bottom of the reboiler section of the distillation column, and any removed product is sent out of the distillation column to be treated or vented to atmosphere 110. Optionally, any disilane recovered from the distillation system 109 may be mixed with an inert gas and reintroduced into reactor 101 as at least part of the first gas mixture 100. This may be performed in either a continuous or a batch type manner. The high purity trisilane product 108 may have a purity between about 99.9% and about 99.99%, by volume, and the trisilane production method may have an overall product molar yield of about 20% to about 40%.

EXAMPLES

The following non-limiting examples are provided to further illustrate embodiments of the invention. However, the examples are not intended to be all inclusive and are not intended to limit the scope of the inventions described herein.

A reactor made of ½ inch OD tubing and with a length of 9 inches was provided, and the reactor was maintained at a temperature of about 460° C. Various gas mixtures containing disilane and argon were introduced to the reactor at rate of 2 liters per minute (lpm), which provides for a reactor residence time of about 2 seconds. Trisilane was produced through a pyrolysis reaction and the concentrations and production rate were then measured.

TABLE 1 below represents the results of several tests which were performed:

| Gas Mixture | Reactor type | Trisilane concentration (%) | Trisilane Production Molar Yield (%) | Production Rate |
|---|---|---|---|---|
| 10% Disilane/Argon | packed | 1.50% | 27% | 7.2 g/hr |
| 20% Disilane/Argon | packed | 1.90% | 20% | 9.0 g/hr |
| 30% Disilane/Argon | unpacked | 1.80% | 25% | 8.5 g/hr |
| 30% Disilane/Argon | packed | 3.20% | 22% | 15 g/hr |
| 50% Disilane/Argon | packed | 2.40% | 31% | 11 g/hr |

While embodiments of this invention have been shown and described, modifications thereof can be made by one skilled in the art without departing from the spirit or teaching of this invention. The embodiments described herein are exemplary only and not limiting. Many variations and modifications of the composition and method are possible and within the scope of the invention. Accordingly the scope of protection is not limited to the embodiments described herein, but is only limited by the claims which follow, the scope of which shall include all equivalents of the subject matter of the claims.

What is claimed is:

1. A method of producing trisilane through a pyrolysis of disilane in a single reactor, comprising:
    a) introducing a first gas mixture into a single reactor, wherein the first gas mixture enters the reactor at about ambient temperature and the first gas mixture comprises disilane and an inert gas, and is substantially free of monosilane;
    b) producing a second gas mixture in the reactor through a pyrolysis reaction of the first gas mixture, wherein the reactor is maintained at a first temperature and the second gas mixture comprises trisilane;
    c) introducing the second gas mixture into a condensing zone, wherein the condensing zone comprises at least a first and a second condenser;
    d) condensing the second gas mixture in the condensing zone to form a condensed mixture;
    e) separating disilane from the condensed mixture, to form a concentrated mixture of trisilane; and
    f) purifying the concentrated mixture of trisilane to obtain a high purity trisilane product.

2. The method of claim 1, wherein the first gas mixture is substantially free of trisilane.

3. The method of claim 1, wherein the first temperature is between about 300° C. and about 500° C.

4. The method of claim 3, where in the first temperature is between about 400° C. and about 475° C.

5. The method of claim 1, wherein the single reactor comprises a packed type reactor.

6. The method of claim 1, wherein the first gas mixture comprise between about 0.1% and about 10%, by weight, of the inert gas.

7. The method of claim 1, wherein the first condenser is maintained at a temperature between about −80° C. and about −60° C.

8. The method of claim 1, wherein the second condenser is maintained at a temperature between about −130° C. and about −100° C.

9. The method of claim 1, wherein the step of condensing comprises initially condensing the second gas mixture in the first condenser, and wherein the step of separating disilane from the condensed mixture comprises separating the disilane through a first condenser to second condenser sparing step.

10. The method of claim 1, further comprising collecting at least part of the disilane separated from the condensed mixture, and mixing the collected disilane with an inert gas to form the first gas mixture for introduction into the reactor.

11. The method of claim 1, wherein the step of separating disilane comprises forming a concentrated mixture of trisilane which comprises about 95%, by weight, of trisilane.

12. The method of claim 1, further comprising removing particles from the second gas mixture by introducing the second gas mixture to a particle trap to remove the particles prior to introducing the second gas mixture to the condensation zone.

13. The method of claim 1, wherein the gas mixture has a residence time in the single reactor between about 1 seconds and about 10 seconds.

14. The method of claim 1, wherein the gas mixture has a residence time in the single reactor between about 4 and about 8 seconds.

15. The method of claim 1, wherein the method produces trisilane with a product molar yield between about 20% and about 40%.

16. The method of claim 1, wherein purifying step comprises purifying the concentrated mixture of trisilane with a distillation step.

17. The method of claim 16, wherein the purifying step comprises purifying the concentrated mixture of trisilane to a high purity trisilane product which has a purity between about 99.9% and about 99.99% by volume.

* * * * *